Feb. 26, 1957 M. P. PEUCKER 2,782,636

INTERNAL BALANCES FOR WIND FORCE MEASUREMENTS ON AERODYNAMIC OBJECTS

Filed Aug. 21, 1950 7 Sheets-Sheet 1

Inventor

MAX P. PEUCKER

By G. H. O'Brien

R. M. Hicks

Attorneys

Feb. 26, 1957 M. P. PEUCKER 2,782,636

INTERNAL BALANCES FOR WIND FORCE MEASUREMENTS ON AERODYNAMIC OBJECTS

Filed Aug. 21, 1950 7 Sheets-Sheet 2

Inventor

MAX P. PEUCKER

By G. D. O'Brien
R. M. Hicks

Attorneys

Inventor
MAX P. PEUCKER

By G. D. O'Brien
R. M. Hicks
Attorneys

Inventor
MAX P. PEUCKER

By G. D. O'Brien
R. M. Hicks
Attorneys

Inventor
MAX P. PEUCKER

By G. D. O'Brien
R. M. Hicks
Attorneys

Feb. 26, 1957

M. P. PEUCKER 2,782,636

INTERNAL BALANCES FOR WIND FORCE MEASUREMENTS ON AERODYNAMIC OBJECTS

Filed Aug. 21, 1950

7 Sheets-Sheet 6

Inventor

MAX P. PEUCKER

By G. D. O'Brien

R. M. Hicks

Attorneys

Inventor
MAX P. PEUCKER

By G. D. O'Brien
R. M. Hicks
Attorneys

United States Patent Office 2,782,636

Patented Feb. 26, 1957

2,782,636

INTERNAL BALANCES FOR WIND FORCE MEASUREMENTS ON AERODYNAMIC OBJECTS

Max P. Peucker, Washington, D. C., assignor to the United States of America as represented by the Secretary of the Navy

Application August 21, 1950, Serial No. 180,684

11 Claims. (Cl. 73—147)

(Granted under Title 35, U. S. Code (1952), sec. 266)

This invention relates generally to devices for measuring the wind forces on aerodynamic objects such, for example, as models of ordnance missiles, rockets, aircraft, and the like, and more particularly to new and improved devices of this character having provision for the internal measurement of one or more components of the wind forces acting externally on the object under test. Such devices are known in the art as balances.

Until now external balances have been used measuring the six component forces of lift, drag, yaw, pitching moment, yawing moment and rolling moment outside of the model with help of mechanical and electrical means. In the external balance system two measurements, a total reading and a tare reading are necessary for determining the actual forces acting on the model. The difference of the two measurements eliminates the forces acting on the sting and support and gives as a result the real forces acting on the model. In case of force measurements on projectiles, rockets, missiles, and the like, the model is connected with a movable tunnel support by a two piece or split sting which is unfavorable from the aerodynamic standpoint. When measuring the total forces, one part of the split or two-piece sting which carries the model is connected with the balance support while the other part of the sting is connected to a dummy support. For getting the tare reading both sting parts including the model are reversed. From experience it is known that the model forces may amount only to a small fraction of the actual total forces. Due to limitations of the spring system very small models can be measured only inaccurately and the largest possible models not at all.

According to the arrangement of the present invention the external forces acting on an aerodynamic model under test are measured internally of the model, and the internal balance constructed in accordance with the principle of the present invention, is located completely inside of the model and is connected with the wind tunnel support by a rigid one piece sting.

The internal measurement is accomplished by the use of small spring systems with special shape and certain spring characteristics which are constructed and arranged in such a way that they can easily be embodied in rotation-symmetric models such as those mentioned hereinbefore, and in cooperative relation with respect to wire resistance strain gages applied to different predetermined surface areas of the spring systems in an appropriate manner effective to individually measure inside of the model the different force components acting outside of the model, these measurements being obtained with a high degree of accuracy and in half the time formerly required in the use of the prior art methods and apparatus.

According to another embodiment of the present invention, novel spring systems and cooperating strain gages provided therefor are arranged internally of a wall section in close proximity to the surface boundary layer whereby the strain gages are effective to yield a resistance variation which is proportional to the friction forces acting on the surface. Whereas the strain gages are disclosed herein as particularly well suited for use in balances of the type considered herein, it will be understood that detecting devices such, for example, as capactive, inductive, and piezoelectric systems may be employed in lieu of the strain gages to yield a capacitance or inductance variation in response to the displacement of the associated spring system, or to yield a voltage variation in response to the pressure on the spring system and piezoelectric element supported thereon.

It is an object of the present invention to provide a balance for internal measurement of the forces acting externally on an aerodynamic body.

It is another object of this invention to provide a new and improved balance for eliminating the need for taking tare readings for the different component forces, thereby saving in this way 50% of the time formerly required for such measurements.

It is another object of this invention to provide by special mechanical and electrical means a balance which will distinguish between the different component forces contributing to a resultant force and to segregate such component forces within the model so that each of them may be indicated and studied separately and the effects of intercoupling between the force components are eliminated.

It is a further object of this invention to increase the accuracy and range of the measurements.

It is a further object of this invention to provide a removable mechanical and electrical coupling between balance and the supporting sting to make possible an easy and fast exchange of the balance in case another range of force is desirable or a repair will be necessary.

Other objects and many of the attendant advantages of this invention will be readily appreciated as the same becomes better understood by reference to the following detailed description when considered in connection with the accompanying drawings wherein.

Figure 1:
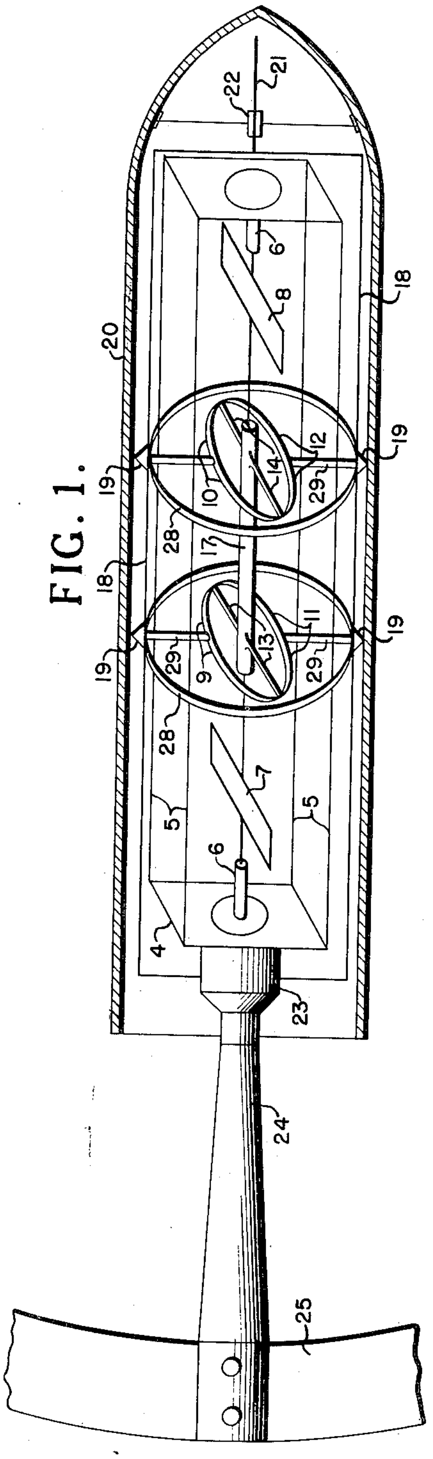
Fig. 1 is a schematic isometric view of a six component internal balance according to the preferred embodiment of the present invention.

Referring now to the drawings and more particularly to Figs. 1 to 6 thereof, it will be seen that in the use of the preferred embodiment of the internal balance of the present invention, six components such as axial force, normal force, side force, pitching moment, yawing moment, and rolling moment can be measured and determined. Fig. 1 shows a schematic sketch of the six component internal balance.

A rigid frame 4 with four prongs 5 and two supports 6, one in the center of each end, carries the measuring system consisting of four spring systems 7—8, 9—10, 11—12, and 13—14. Spring system 7—8 measures the axial force A, Fig. 2, spring system 9—10 measures two normal force components $N_1$ and $N_2$, spring system 11—12 measures two side forces $Y_1$ and $Y_2$, Fig. 3, and spring system 13—14 measures rolling moment $M_r$ around the longitudinal axis. Spring system 7—8 consists of two springs for constructive reasons, as will appear more fully in detail hereinafter, each spring 7—8 being connected at one end with a frame support 6 and at the other end with a rod 17. This rod is also the support for the normal force springs 9—10, the side force springs 11—12, and the rolling moment springs 13—14. Springs 9 and 11 are joined at their ends to springs 13 and together form an ellipse of which springs 13 lie along the long axis of the ellipse. Similarly, springs 10, 12 and 14 are joined together to form a similar ellipse. These ellipses have their centers located on the axis of rod 17 and are secured as by small webs 29 to a pair of rings 28 which are concentric with the axis of rod 17.

The frame 4 with all the spring systems connected thereto is put into a cylindrical case 18 in such a way that the normal force springs 9—10, the side force springs 11—12, and the rolling moment springs 13—14 have tight connections with the case by means of the rings 28 while the axial force springs and the frame 4 have sufficient clearance all around.

The case 18 is furnished with two rims 19 which carry the model 20 by making line contact therewith along two distinct lines and transfer the normal and side forces acting on the model directly to both the normal and side force springs.

In front of the case and in the centerline of it there is a push rod 21 which by means of a suitable clamp device such, for example, as the collet 22 is firmly connected to the model 20 and transfers the axial forces through the case 18, rings 28, webs 29, spring systems 9 to 14 to the rod 17 and finally to the axial force springs 7—8.

The rolling moment is transmitted by way of push rod 21, case 18, rings 28, webs 29, and springs 9 to 12 to the rolling moment springs 13—14, by reason of the special shape and arrangement of the springs and the specific location of the strain gages therein. As will be described in detail hereinafter, the different components act independently of each other, thereby preventing an interaction between the spring systems.

By loosening the clamp 22 it is possible to move the model back and forth over the stationary balance as is sometimes necessary, if the center of pressure has an unfavorable position with regard to the two normal or side force springs.

The frame 4 of the balance is connected by a removable mechanical and electrical coupling 23 with one-piece tapered sting 24 which is supported by the movable wind tunnel structure 25. The sting has such a length that the center of the internal balance, i. e., the point on the axis of rod 17 midway between the ends thereof, coincides with the center of the test rhombus in the wind tunnel. Coupling 23 preferably makes a threaded connection as by the right and left hand threads 105 and 106 to the sting 24 and frame 4 respectively, and includes conventional male and female electrical connections 107 and 108 carried respectively by frame 4 and sting 24. (See Fig. 4.)

Figure 2:
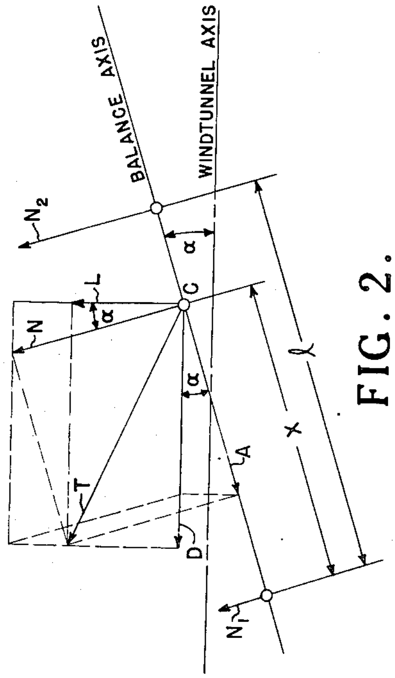
Fig. 2 is a diagram of the forces acting on the balance in a vertical plane through the longitudinal axis of the model.
Figure 3:
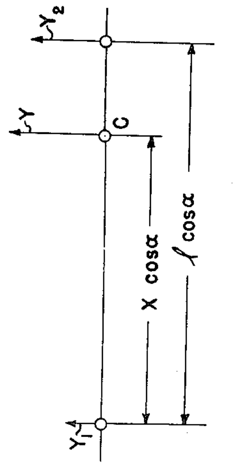
Fig. 3 is a diagram of the forces acting on the balance in a plane through the longitudinal axis and perpendicular to the vertical plane.

Figs. 2 and 3 show schematic diagrams of the forces acting on the balance in a vertical plane and in a plane perpendicular thereto respectively when the surrounding model 20 is exposed to wind forces in a wind tunnel under a certain angle of attack.

Assuming the total force T is acting in point C, the center of pressure, which in this example is located between the two normal force components $N_1$ and $N_2$ in a distance X from the spring axis of $N_1$. The distance between $N_1$ and $N_2$ is called $l$.

The total force T can be resolved into its two components; axial force A and normal force N. These forces are measured by means of the spring systems mentioned hereinbefore. Knowing these forces and the angle of attack $\alpha$, the finally desired forces of drag D and lift L can be calculated from the formulae:

$$D = A \cos\alpha + N \sin\alpha$$
$$L = N \cos\alpha - A \sin\alpha$$

The total normal force N is the sum of the two components $N_1$ and $N_2$ $$N = N_1 + N_2$$

The pitching moment M is the difference of the two components $N_1$ and $N_2$ times half the distance $l$.

$$M = (N_1 - N_2)\frac{l}{2}$$

The distance X of the center of pressure from the reference point $N_1$ is $$X = \frac{N_2}{N} l$$

The total side force Y is the sum of the two components $Y_1$ and $Y_2$ $$Y = Y_1 + Y_2$$

The yawing moment $M_y$ is the difference of the two components $Y_1$ and $Y_2$ times half the distance $l \cos\alpha$ $$M_y = (Y_1 - Y_2)\frac{l}{2}\cos\alpha$$

Figures 4, 5, 6:
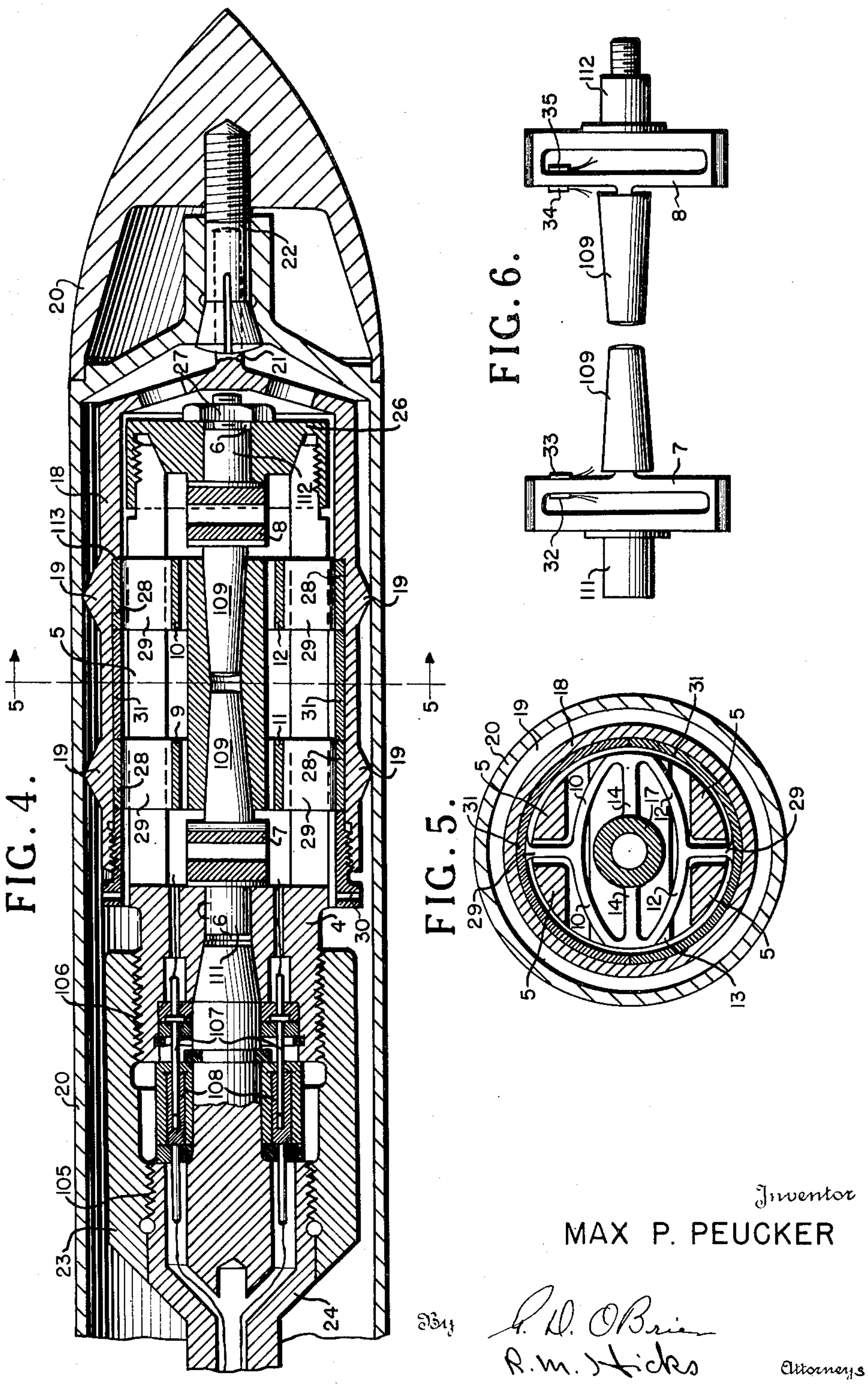
Fig. 4 is a longitudinal section of an actual model embodying the invention and which has been used and tested to prove the principle of the present invention.
Fig. 5 is a vertical section view, taken on the line 5—5 of Fig. 4.
Fig. 6 is a top view of the two axial force springs disclosed in Fig. 4.

To get linear characteristics, good repeats of the measurements and accurate zero readings, normal force springs 9—10, side force springs 11—12, and rolling moment springs 13—14, the joining rod 17, webs 29, and rings 28 are made of one piece, as may best be seen in Figs. 4 and 5. Firmly attached on both ends of the bar 17, as by the self-holding tapers 109 engaged therewith, are the two axial force springs 7—8.

Under a predetermined preload of springs 7—8 they are thus rigidly connected with the frame 4, the special nut 26 being employed at the open end of the frame to hold the four prongs 5 of the frame tightly together as by threaded connection therewith. This nut also adjusts the preload which has to be somewhat larger than the maximum axial load, to prevent any troublesome movement in the bearing supports 6. These supports, of course, refer to the structure adjacent the outer ends of the axial force springs and including the shafts 111 and 112 individual thereto for securing the spring system to the ends of frame 4.

A lock nut 27 with a left hand thread prevents a loosening of nut 26 which has a right hand thread.

Figure 7:
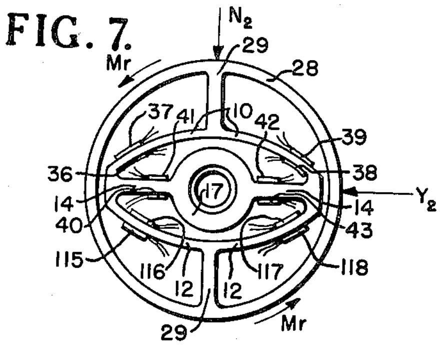
Fig. 7 shows the arrangement of the wire resistance strain gages for one normal force spring, side force spring and rolling moment spring system.

As best seen in Figs. 4, 5 and 7, springs 9—11 and 10—12 are elliptical flat springs with the center thereof in the center of cylindrical rings 28 individual thereto and connected on the outside to the rings by webs 29 of small rectangular cross section. On the inside, the elliptical springs are connected with the cylindrical rod 17 by straight flat springs 13, 14 which have the same width as springs 9—11 and 10—12 and are used for measuring the rolling moment around the longitudinal axis. The rings 28 fit precisely inside of a cylindrical case 18 and are tightly connected with it by a ring nut 30 in engagement with one of the rings and a split spacer ring 31 which urges the other of the rings against the shoulder 113 in the case 18 as the ring nut 30 is tightened in the case.

By reason of the special shape of the normal and side force springs, they have a low moment of inertia in planes perpendicular to the longitudinal axis of the balance but a very high moment of inertia parallel to this axis, with the result that these springs are very sensitive to normal and side forces but insensitive to axial forces. The opposite condition is true for the axial force springs 7—8, shown in Figs. 4, 5 and 6. They are also flat springs of special shape and each made of one piece with a low moment of inertia in the axial direction and a very high moment of inertia perpendicular to this axis, with the result that these springs are very sensitive to axial forces but insensitive to normal forces, side forces, and also to rolling moments.

The rolling moment springs 13—14, which are straight flat springs and combined with the normal force and side force springs, have a low moment of inertia in the vertical direction but a very high moment of inertia parallel to the longitudinal axis.

To measure the forces acting on the different spring systems by electrical means, wire resistance strain gages, for example, have been provided which convert mechanical forces causing a corresponding stress and strain within the springs into electrical potential differences of the order of millivolts. These small amounts of voltage are amplified in special amplifiers and finally read on milliammeters or recorded by recorders. Amplifiers or recorders are located outside of the model and connected with the strain gages by shielded wires.

Instead of strain gages, other electrical systems such as inductive, capacitive or piezoelectric systems can be used, wherein the spring deflections are utilized to produce a variation in the air gap of an inductive circuit, a variation in the spacing of condenser plates, or a variation in pressure on a piezoelectric element respectively proportional to the external forces on the model.

Figure 8:
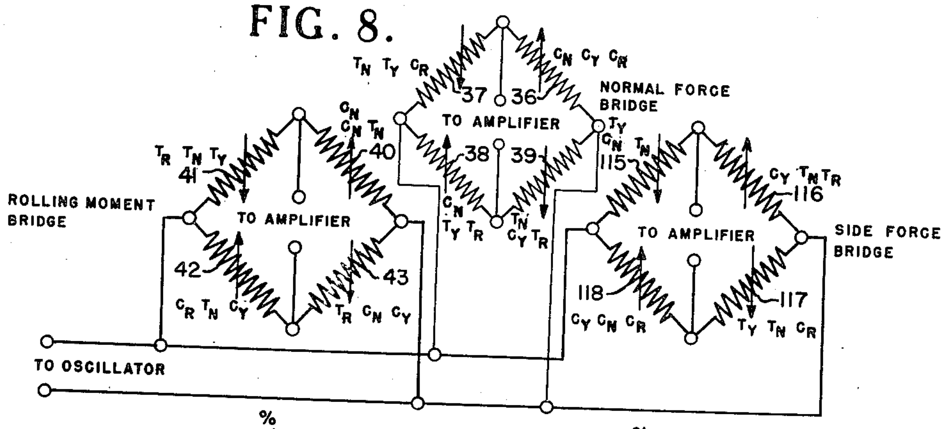
Fig. 8 shows the bridge circuits for the strain gages of Fig. 7.

The electrical measuring elements are connected in Wheatstone's bridge circuits using four active elements for each component in certain arrangements. Fig. 6 shows the arrangements of four strain gages 32, 33, 34, 35 on the two axial force springs 7 and 8. Fig. 7 shows four strain gages 36, 37, 38, 39 for one normal force spring system; four strain gages 115, 116, 117 and 118 for one side force spring system; and four strain gages 40, 41, 42 and 43 for one rolling moment spring system. Fig. 8 illustrates the Wheatstone bridge circuits for the spring systems of Fig. 7. In each bridge circuit with its four active strain gages, two strain gages measure tension, designated $T_N$, $T_Y$ and $T_R$, and the other two strain gages measure compression, designated $C_N$, $C_Y$ and $C_R$. The letters $T_N$ and $C_N$ are used to designate the tension and compression of the strain gages in the bridge circuits, i. e. when the normal force springs, for example, measure normal forces in response to the component to be measured thereby, while the letters $T_Y$, $T_R$ and $C_Y$, $C_R$ designate the tension and compression of the strain gages due to interaction and which are cancelled in the bridge circuit; i. e. $T_Y$ and $C_Y$ occurring when the normal force springs, for example, respond to side forces and $T_R$ and $C_R$ occurring when the normal force springs respond to rolling moment. This will be explained in more detail with reference to Figs. 7 and 8.

It may be assumed, that on the whole spring system of Fig. 7 a pure normal load $N_2$ is acting. The center of this spring system is fixed. The normal load $N_2$ is transferred by the ring 28 and the two webs 29 partly to the normal force spring system 10, causing a pushing effect; partly to the side force spring system 12, causing a pulling effect and partly to the rolling moment spring system 14, causing a push and pull effect.

The pushing effect on spring system 10 causes tension on the upper surfaces and compression on the lower surfaces of the spring system 10. With regard to the attached strain gages 36, 37, 38, 39, the two strain gages 37 and 39 are subjected to tension $T_N$ and the other two strain gages 36 and 38 are under compression $C_N$. The arrangement of these four strain gages in the Wheatstone bridge circuit for the normal force can be seen in Fig. 8. The bridge, which without any load on the springs 10 has to be balanced, will become unbalanced by the load $N_2$ because the two strain gages 37 and 39 increase their resistance, while the other two strain gages 36 and 38 decrease their resistance in the same amount. The voltage difference across the bridge due to this unbalance is directly proportional to the applied load and after passing through an amplifier can be read on a meter or recorded by a recorder.

The pulling effect of the normal force $N_2$ on the side force spring system 12 causes tension on the upper surfaces and compression on the lower surfaces of the spring system 12. Regarding the attached four strain gages 115, 116, 117 and 118, the two strain gages 116 and 117 are in tension $T_N$ and the other two strain gages 115 and 118 are under compression $C_N$. The arrangement of these four strain gages in the Wheatstone bridge circuit for the side force can be seen in Fig. 8. The two strain gages 115 and 118, which form two adjacent arms of the bridge circuit, decrease their resistance in the same amount and the other two strain gages 116 and 117, which form the other two adjacent arms of the bridge circuit, increase their resistance in the same amount, whereby the total bridge circuit will stay balanced with the result that a normal force has no interaction effect on the side-force spring system 12.

The push and pull effect of the normal force $N_2$ on the rolling moment spring system 14 causes tension on the upper surfaces and compression on the lower surfaces of the spring system 14. Regarding the four strain gages 40, 41, 42 and 43, the two strain gages 41, 42 are in tension $T_N$ and the other two strain gages 40, 43 are under compression $C_N$. The arrangement of these four strain gages in the Wheatstone bridge circuit for the rolling moment springs 14 is shown in Fig. 8. The two strain gages 41, 42 which form two adjacent arms of the bridge circuit increases their resistance in the same amount and the other two strain gages 40, 43 which form the other two adjacent arms of the bridge circuit decrease their resistance in the same amount, whereby the total bridge circuit will stay balanced with the result that a normal force also has no interaction effect on the rolling moment spring system 14.

In a similar manner and as indicated by the lengths $T_N$, $T_Y$, $T_R$ and $C_N$, $C_Y$, $C_R$ in Fig. 8, it will be apparent that the side force spring system 12 in response to the side force $Y_2$ causes an unbalance in the bridge circuit 115, 116, 117 and 118, and no unbalance of the corresponding bridge circuits of the normal force and rolling moment spring systems 10 and 14 respectively is produced in response to the side force.

Also, in like manner, it will be apparent that the bridge circuit 40, 41, 42 and 43 of spring system 14 will become unbalanced in response to the rolling moment $M_R$ indicated in Fig. 7, and no unbalance will be produced in the corresponding bridge circuits of the normal force and side force spring systems 10 and 12 respectively in response to the rolling moment.

Figure 9:
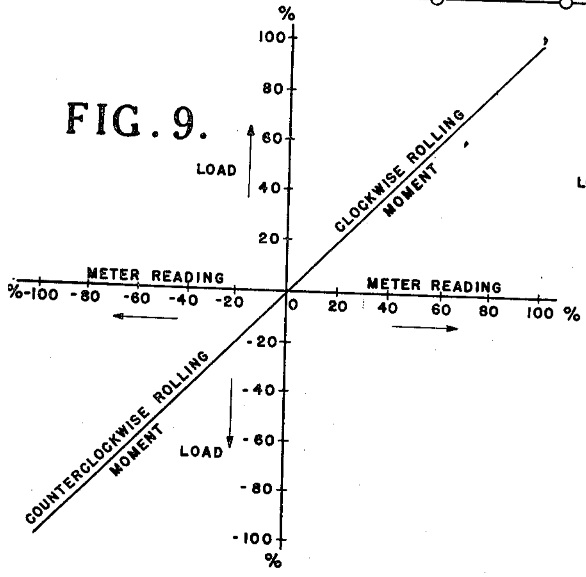
Fig. 9 shows the calibration curve of the rolling moment spring.
Figure 10:
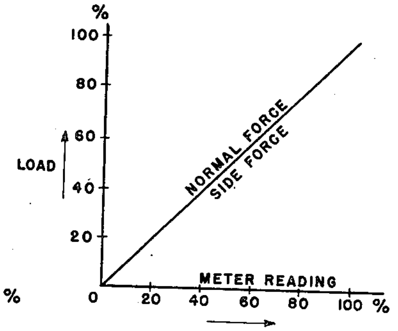
Fig. 10 shows the calibration curve of either a normal force spring or a side force spring.

Fig. 9 and Fig. 10 respectively show the calibration curves for a clockwise and counter-clockwise rolling moment; and one normal force and one side force component applied to the internal balance of the present invention. All these curves are linear and repeatable in subsequent measurements. This desirable characteristic, especially with regard to calibration, is obtained by the manufacturing of the whole spring system of one piece, preventing in this way any troublesome joints made with screws, pins or rivets. The embodiment of the invention that has been disclosed may be modified to meet various requirements.

Figs. 11–25 show different types of internal balances which are used in such cases where the six component internal balance may be too large or where measurement of only a single component or a certain combination of different components is desired.

Figure 11:
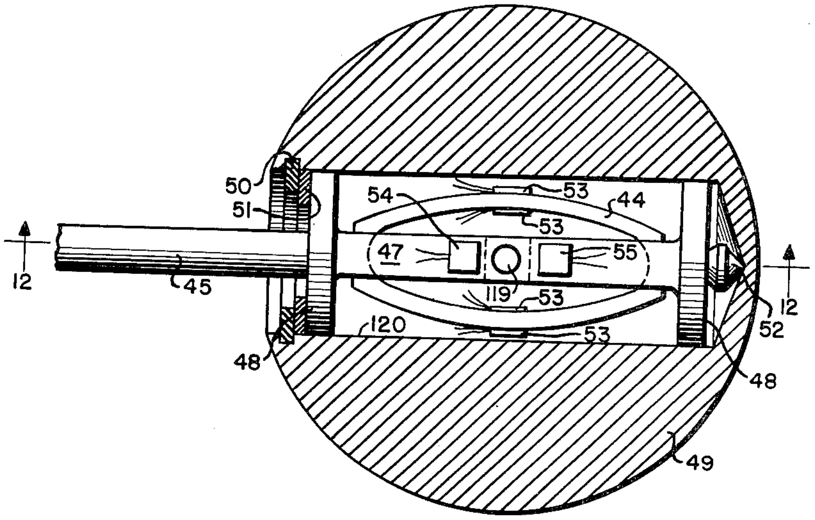
Fig. 11 shows the top view of a three component internal balance according to another embodiment of the present invention and embodied in a sphere, shown in section.

For wind tunnel investigations, using small spheres, a three component internal balance of small size has been developed, measuring axial force and two normal force components simultaneously. Fig. 11 shows the top view, Fig. 12 a longitudinal section and Fig. 13 a side view of this balance.

The axial force is measured by a single elliptical flat spring 44 which is combined at one end with a sting 45 and connected at the other end with the spring system for two normal force components. This normal force spring system consists of a spring support 46 connected to ellipitical spring 44 by being pressed thereto and two flat springs 47 supported in the center by support 46 to which it is secured as by tapered pins 119 and held together by two cylindrical rings 48 which carry the sphere model 49, the model 49 having a suitable bore 120 for the purpose. The sphere is held together with the balance by a snap ring 50 and a spring washer 51. Each ring 48 with the two flat one-half spring portions 47 adjacent thereto measures one of the normal force components, and the sum of both gives as a result the total normal force.

As the axial force is directly transferred to the axial force spring by a movable double cone 52 it has no influence on the normal force measurement and vice versa. The windforces acting on the model are measured by measuring the strain in the spring systems, using wire resistance strain gages, for example, each component has four active strain gages combined to form a Wheatstone bridge circuit.

Figure 12:
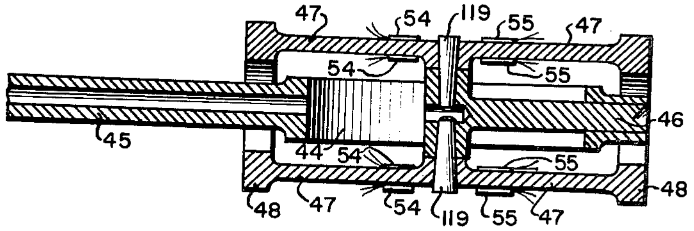
Fig. 12 shows a longitudinal section of the three component internal balance without the sphere, taken on the line 12—12 of Fig. 11.
Figure 13:
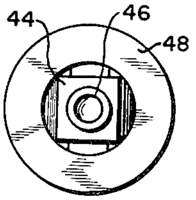
Fig. 13 is a right end view of the balance as shown in Fig. 12.

Fig. 11 shows the four strain gages 53 on the axial force spring 44, and Fig. 12 shows four strain gages 54 and four strain gages 55 which are mounted on the normal force one-half spring portions.

Figure 14:
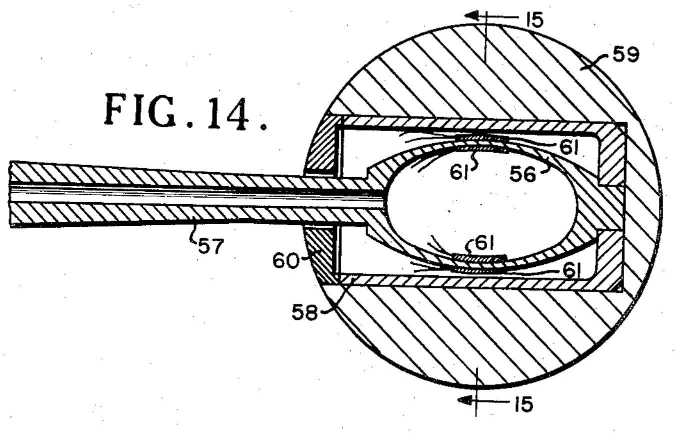
Fig. 14 is a top view of a miniature axial force balance according to a further embodiment of the invention and embodied in a sphere.
Figure 15:
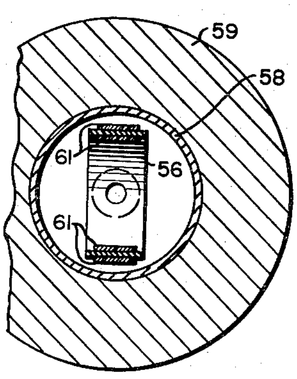
Fig. 15 is a fragmentary cross sectional view of Fig. 14 taken on the line 15—15 thereof.

For very small models to be used in hypersonic windtunnels for drag measurements a single component axial force internal balance has been developed, shown in Figs. 14 and 15. It consists of an elliptical flat spring 56 made of one piece together with the sting 57 and a cylindrical case 58 which carries the model, for instance, a small sphere 59 held in place by a split cap 60. Four strain gages 61 in the center of the spring measure the axial force.

Figures 16, 17:
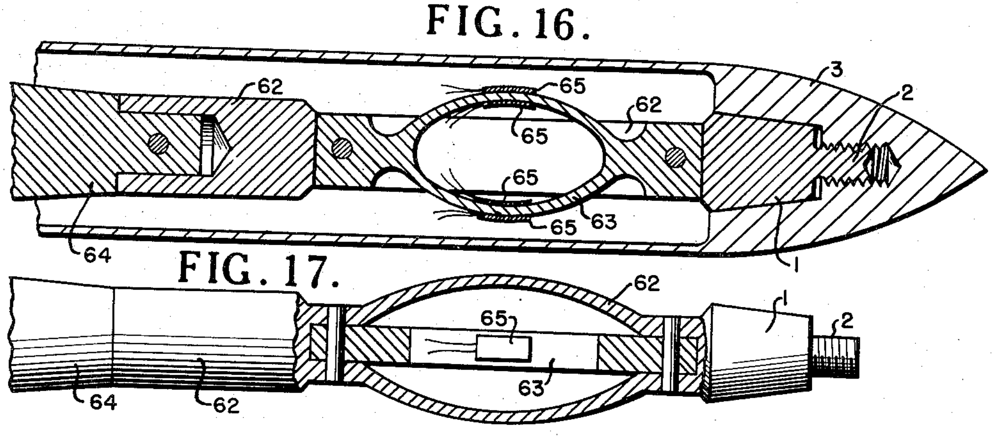
Fig. 16 is a longitudinal sectional view of a modified axial force balance.
Fig. 17 is a side view in elevational and partly in section of the spring system of Fig. 16, the model being removed.

Figs. 16 and 17 show another type of an axial force internal balance for measuring larger axial forces in combination with normal and side forces which, however, should not be measured but should have no intercoupling effect on the axial force measurements. For this reason two elliptical flat springs 62 and 63 with 90 degrees displacement have tightly been joined to one unit and connected to a one-piece sting 64. Four strain gages 65 measure the axial force. Spring 62 has a taper 1 with a threaded bolt 2 which carries the model 3.

Figures 18, 19:
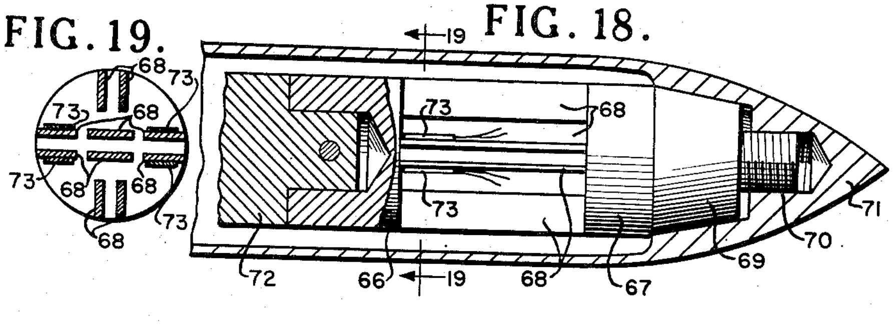
Fig. 18 is a top view of a rolling moment internal balance according to still a further embodiment of the present invention.
Fig. 19 is a cross section taken on line 19—19 of Fig. 18, the model not being shown.

Figs. 18–19 disclose a one component rolling moment internal balance which measures rolling moments around the longitudinal axis. It consists of two cylindrical parts 66, 67 which are tightly connected by ten small straight flat springs 68 in such a way that the whole system has a high moment of inertia to bending forces in the planes of pitch and yaw of the model, but a small moment of inertia to twisting forces which produce a rolling moment. The cylindrical part 67 has a taper 69 with a threaded bolt 70 for fastening the model 71 while the other cylindrical part 66 is connected with a sting 72. The rolling moment is measured by use of four strain gages 73.

Figure 20:
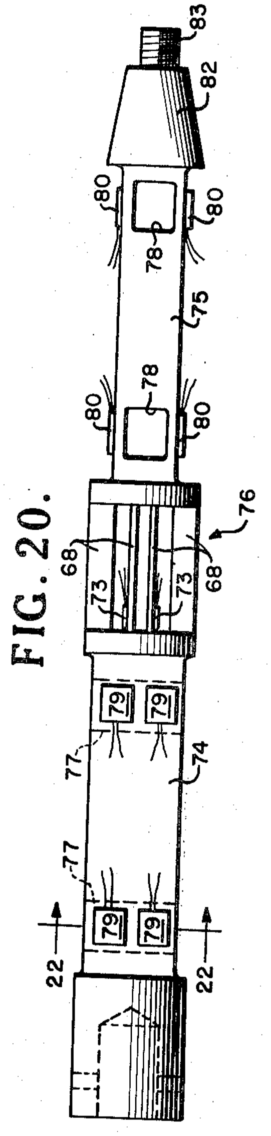
Fig. 20 shows the top view of a five component internal balance, according to another embodiment of the invention.
Figure 21:
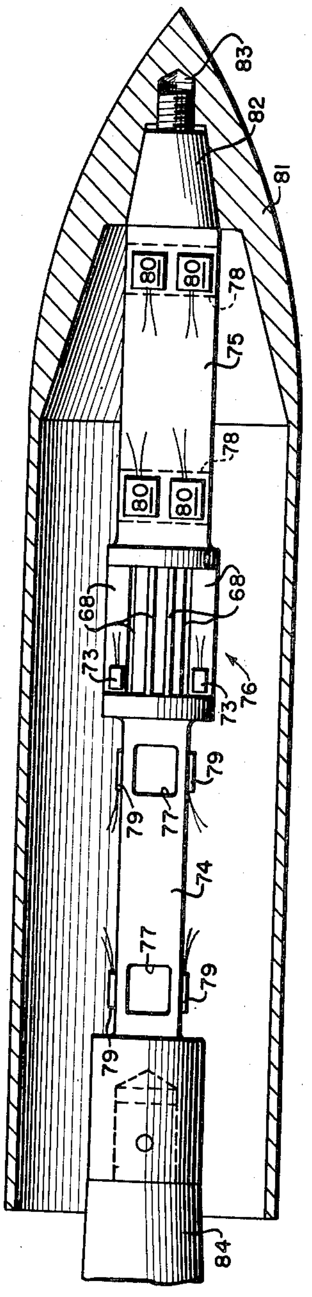
Fig. 21 shows the side view of Fig. 20 with an attached model shown in section.
Figure 22:
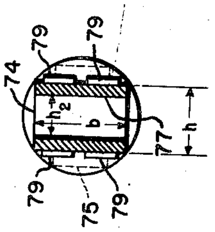
Fig. 22 shows the cross section on the line 22—22 of Fig. 20.

Figs. 20–22 show a five component internal balance for simultaneous measuring of two pitching moments, two yawing moments and rolling moment. It consists of two rectangular beams 74 and 75 for measuring pitching and yawing moment, connected by a rolling moment balance 76 of the same type as disclosed in Figs. 18 and 19.

The beams have pairs of spaced holes 77 and 78 respectively which produce small areas of concentrated stress. The beams each have a rectangular cross section and are displaced with respect to each other 90° about the longitudinal axis such that the narrow surfaces of one beam are parallel to the wider surfaces of the other beam, the holes 77 and 78 in each case being parallel to the wider surfaces of the beam individual thereto. In each of these areas a pair of strain gages 79 for beam 74 and a pair of strain gages 80 for beam 75 are cemented to opposite outer surfaces of the beams to measure the different moments.

The model 81 is connected with the balance by a taper 82 and a threaded bolt 83 in front of beam 75. The rear of beam 74 is conected with a sting 84.

The deflection of a beam is represented mathematically by the formula:

$$F=\frac{PL^3}{3EI}$$

where

F is the deflection
P is the load
L is the length of lever arm
E is modulus of elasticity
I is the moment of inertia It will be noted that F is inversely proportional to I and this is used to advantage in the arrangement of the device of Figs. 20–22 wherein I is large for the pitch beam 74 in the yaw direction and I is large for the yaw beam 75 in the pitch direction. Thus a small deflection of beams 74 and 75 occurs in response to yaw and pitch moments respectively whereby the coupling between the pitch and yaw systems combined as a unit is greatly reduced by a factor such, for example, as 1 to 4.

Assuming beam 74 has a height *h* and a switch *b*—2*h* then there will be the ratio $$\frac{h}{b}=\frac{1}{2}$$

The axis of the cross section parallel to $b$ is called $x$ and the axis of the same cross section parallel to $h$ is called $y$. With reference to these axes the formulae for the moments of inertia $I_x$ and $I_y$ respectively are:

$$I_x=\frac{bh^3}{12}=\frac{2hh^3}{12}=\frac{1}{6}h^4$$

$$I_y=\frac{hb^3}{12}=\frac{h8h^3}{12}=\frac{2}{3}h^4$$

or $$\frac{I_x}{I_y}=\frac{1}{4}$$

$$I_y=4I_x$$

or

The deflections $F_x$ and $F_y$ with reference to the moments of inertia $I_x$ and $I_y$ will be:

$$F_x=\frac{PL^3}{3EI_x}$$

and $$F_y=\frac{PL^3}{3EI_y}$$

or the ratio $$\frac{F_x}{F_y}=\frac{I_y}{I_x}=\frac{4}{1}$$

$$F_y=\frac{1}{4}F_x$$

The deflection of beams 74 and 75 in the pitch and yaw directions respectively is greatly reduced while nevertheless providing sufficient stress in the aforementioned concentrated stress areas by reason of the specific cross-section of the beams at the stress areas. This can be shown mathematically by the formula:

$$S_1=\frac{MC_1}{I_1}$$

and $$S_2=\frac{MC_2}{I_2}$$

where $S_1$ is the stress in a beam with a solid rectangular cross section with the width $b$ and the height $h_1$.

$C_1$ is the distance from the neutral axis to the outer fiber $=\frac{h_1}{2}$.

$I_1$ is the moment of inertia—$bh_1^3$.

$S_2$ is the stress in a beam with a rectangular cross section with the width $b$ and the height $h$ but with a rectangular hole with the width $b$ and the height $h_2$.

M is the moment$=PL$.

$C_2$ is the distance from the neutral axis to the outer fiber $=\frac{h}{2}$.

$I_2$ is the moment of inertia$=\frac{b}{12}(h^3-h_2^3)$.

Under the assumption that both cross sections mentioned before shall have the same stress we get the equation $$\frac{MC_1}{I_1}=\frac{MC_2}{I_2}$$

$$I_2=\frac{C_2}{C_1}=I_1$$

$\frac{C_2}{C_1}$ is called factor $K$ $$K\geqq 1$$

$$I_2=KI_1$$

The deflection for the solid rectangular cross-section may be $$F_1=\frac{PL^3}{3EI_1}$$

and for the rectangular cross-section with the base $$F_2\frac{PL^3}{3EI_2}$$

or the ratio will be $$\frac{F_1}{F_2}=\frac{I_2}{I_1}$$

$$=\frac{KI_1}{I_1}$$

$$=\frac{K}{1}$$

$$F_2=\left(\frac{1}{K}\right)F_1$$

Figs. 23 to 27 show a measuring system using modified internal balances which measures directly in restricted predetermined areas the friction on plain surfaces produced by an air or water flow parallel to this surface. Until now these friction forces were calculated from data obtained from measurements performed, for example, with pitot tubes located in different distances perpendicular to the surface to be tested. This method gives only approximate results because it is impossible to measure with a pitot tube the boundary layer close to the surface which is the most important one.

Figures 23, 24:
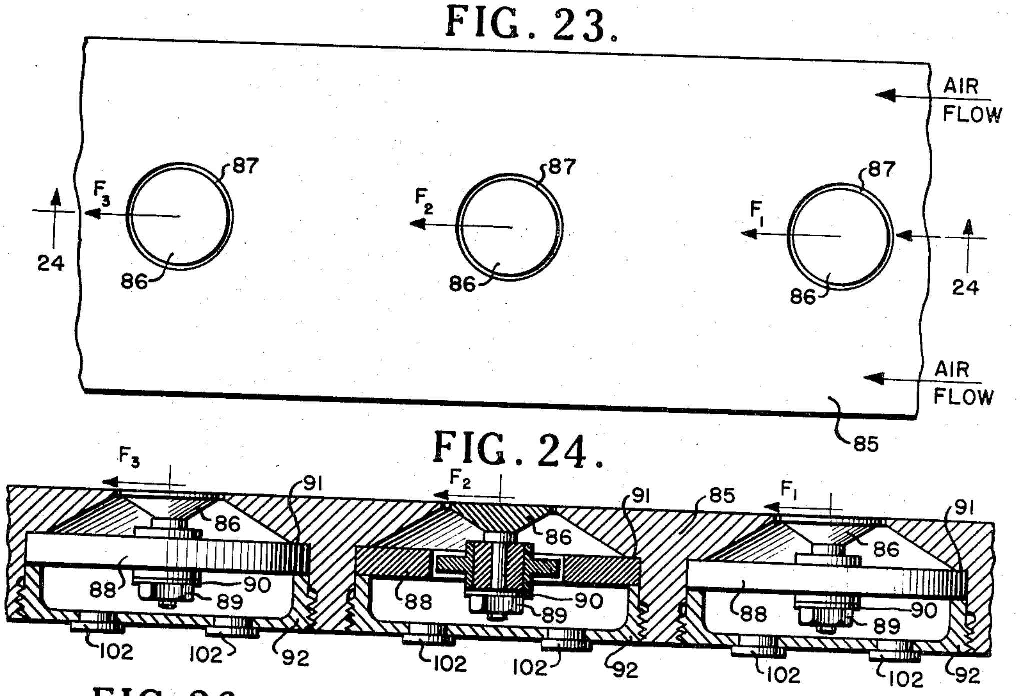
Fig. 23 shows the top view of a plate section having arranged therein modified internal balances for direct measurements of friction on a plain surface of the section, produced by air, blowing parallel to the surface.
Fig. 24 is a section on line 24—24 of Fig. 23.

Fig. 23 is the top view of a section of a plate with a plain surface 85 to be tested with three test members 86 in known distances which are separated from the plate by very small concentric air gaps 87. The members 86 are connected with three modified internal balances 88, located inside of the plate as shown in Fig. 24 and may be of round or square shape. In the present example, they are circular discs with small edges, short tapers and cylindrical shafts threaded at the ends which are firmly connected with the center of the internal balances by nuts 89 and spring washers 90. The surfaces of the test members are exactly flush with the plate surface.

Figure 26:
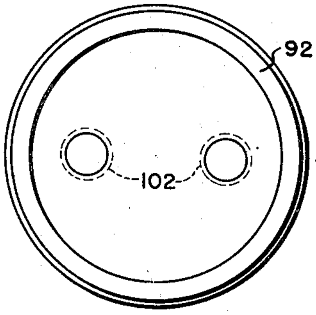
Fig. 26 is a top plan view of the cover for the internal balance of Fig. 24.
Figure 25:
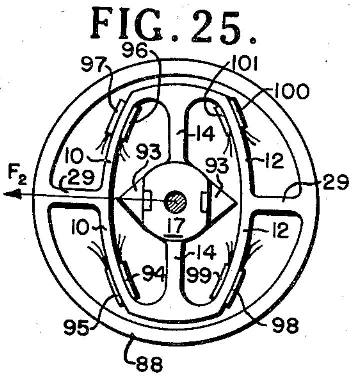
Fig. 25 shows the top view of one of the modified internal balances of Fig. 24.
Figure 27:
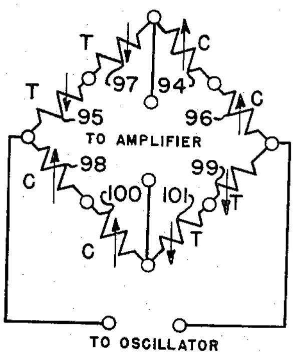
Fig. 27 shows the Wheatstone bridge circuit of the wire resistance strain gages of Fig. 25.

The internal balances are held in place by bores with annular shoulders 91 and cylindrical covers 92 within the plate. Fig. 26 shows the top view of such a cover with two holes for assembly, which during the tests are closed with two stoppers 102. Fig. 25 shows the top view of internal balance 88 without the test member 86. The spring system employed is in principle the same as that used for measuring normal force, side force and rolling moment components in the six component internal balance, but in this particular case the whole spring system measures only one force, i. e., the friction force on the surfaces of test members 86.

To prevent damage of the fine small edges on the test members 86 and on the plate holes, mechanical stops 93 have been provided. As the forces acting on the small disc surfaces are very small, eight active strain gages 94—101 are used for the measurements. They are combined in a Wheatstone bridge circuit in accordance with the arrangement of Fig. 27.

The function of the measuring system is as follows:

Parallel to plate 85 from right to left, for example, a uniform air flow is blowing. The plate has a knife edge at the entrance of the air flow to keep the flow laminar. The three test members 86 are exposed to friction forces parallel to the plate. They are designated with $F_1$, $F_2$ and $F_3$. The magnitude of these forces is subject to the surface area of the test members and the Reynolds number. The forces $F_1$, $F_2$ and $F_3$ are transferred from the test members 86 to the supports 17 which are located in the center of the spring systems 10, 12 and 14 and joined with spring system 14. Spring systems 10 and 12 are joined at their ends with spring system 14 and with their centers by two webs 29 with cylindrical rings 88, which are fixed in bores 91 inside of plate 85. By the friction forces spring systems 10 and 14 are bent and spring systems 12 are stretched. The eight strain gages 94—101 which are cemented on the surfaces of spring systems 10 and 12 act in such a way that strain gages 95 and 97 of spring systems 10 and strain gages 99 and 101 of spring systems 12 are exposed to tension T while the strain edges 94 and 96 of spring systems 10 and strain gages 98 and 100 of spring systems 12 are exposed to compression C, thereby resulting in an unbalance of the Wheatstone bridge shown in Fig. 27. The voltage difference across the bridge due to this unbalance is directly proportional to the acting forces and after passing through an amplifier can be read on a meter or recorded by a recorder.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. An internal balance for measuring an external force applied axially to an aerodynamic body supported on a one piece sting without introducing measurable quantities due to side and normal forces acting on the body comprising, in combination, a pair of elliptical flat springs arranged symmetrically in opposed relation about the axis of the body and joined together at the ends thereof to form a unitary structure, means at one of the joined ends of the springs for securing said unitary structure to the sting, means at the other of said joined ends of the springs for securing the body to said unitary structure, two pairs of active strain gages for each of said springs respectively, the strain gages of each pair being disposed on opposite side surfaces of the spring individual thereto, and means arranged externally of the body and connected electrically to said strain gages for producing a visual indication of the magnitude and direction of said axial force, said strain gages being arranged in a bridge circuit in such a manner that the outputs thereof cancel in the bridge circuit in response to the compressional and tension forces in the springs due to the normal and side forces acting on the body.

2. An internal balance for measuring simultaneously three external force components acting on an aerodynamic body supported on a one piece sting as a pair of spaced forces perpendicular to the longitudinal axis of the body in a perpendicular plane through the longitudinal axis and as a force acting along the axis without introducing measurable quantities of interaction between the different components, comprising, in combination, an elliptical flat spring comprising a pair of integrally formed semi-elliptical springs arranged symmetrically with respect to the axis of the body, four straight flat springs having two cylindrical rings at their ends for supporting the body and forming a unitary structure, means at one end of the elliptical flat spring for securing said unitary structure thereto, means for securing the body to said unitary structure, two pairs of active strain gages for the elliptical flat spring, four pairs of active strain gages for said four straight flat springs respectively, the strain gages of each pair being disposed on opposite side surfaces of the spring individual thereto, and means arranged externally of the body and connected electrically to said strain gages for producing a visual indication of the magnitude and direction of said forces, said strain gages being arranged in bridge circuits in such a manner that the outputs thereof cancel in the bridge circuit for the axial force spring in response to normal forces and side forces respectively and for the normal force springs in response to side forces acting on the body.

3. An internal balance for measuring an external rolling moment around the longitudinal axis of an aerodynamic body supported on a one piece sting without introducing measurable quantities due to normal, side, and axial forces acting on the body, comprising, in combination, two cylindrical discs each disposed symmetrically about said axis of the body and arranged in spaced relation therealong, a plurality of rectangular flat springs interconnecting said discs to form a unitary structure, means at one of the ends of the springs for securing said unitary structure to the sting, means at the other of said ends of the springs for securing the body to said unitary structure, said springs being arranged in groups of two adjacent springs, two pairs of active strain gages for two of said groups of springs respectively, the strain gages of each pair being disposed on the outside surfaces of the group of springs individual thereto, and means arranged externally of the body and connected electrically to said strain gages for producing a visual indication of the magnitude and direction of said rolling moment, said strain gages being arranged in a bridge circuit in such a manner that they only respond to rolling moments in clockwise or counterclockwise direction but cancel in the bridge circuit in response to normal forces, side forces, and axial forces acting on the body.

4. An internal balance for measuring simultaneously two pitching moments, two yawing moments and clockwise or counterclockwise rolling moments produced by forces applied externally to an aerodynamic body supported on a one piece sting without introducing measurable quantities due to axial forces acting on the body and without interaction between the different moments acting on the body, comprising, in combination, two rectangular beams, each beam comprehending two spaced transverse openings to produce small areas of concentrated stress with a minimum of deflection, a rolling moment balance interconnecting said beams to form a unitary structure in such a manner that said rectangular beams are displaced from each other ninety degrees around the longitudinal axis to minimize the deflection of the total beam in the pitch and yaw planes and joined adjacent ends thereof to the rolling moment balance, means at the outer end of one of beams for securing said unitary structure to the sting, means at the outer end of the other of said beams for securing the body to said unitary structure, four pairs of active strain gages for each of said beams respectively, the strain gages of each pair being disposed adjacent an opening in the beam individual thereto on opposite side surfaces of the beam, said rolling moment balance comprising a pair of discs secured respectively to said adjacent ends of said beams and a plurality of rectangular flat springs interconnecting said discs, said flat springs being arranged in groups of two springs, two pairs of active strain gages for said groups of springs respectively, the strain gages of each pair being disposed on outside surfaces of the group of springs individual thereto, and means arranged externally of the body and connected electrically to said strain gages for producing a visual indication of the magnitude and direction of said pitching, yawing and rolling moments, said strain gages being arranged in bridge circuits in such a manner that the strain gages on the pitching moment beam respond only to pitching moments, the strain gages on the yawing moment beam respond only to yawing moments, and the strain gages on the rolling moment springs respond only to rolling moments but cancel in the bridge circuit in response to axial forces acting on the body.

5. An internal balance system for measuring friction forces on the plane surface of a plate to be tested produced by an air or fluid flow parallel to the plane surface and in the direction of said flow comprising, in combination, a plurality of measuring units embodied in openings in said plate in predetermined spaced relation, each measuring unit including a supporting ring and three spring systems joined together to form a unitary structure and a friction sensitive member, said structure having a central portion for supporting the friction member individual thereto in alignment with said plane surface of the plate, said structure having mechanical stops to prevent overloading of the spring systems and resultant deformation of the unit, said ring supporting the unit individual thereto in said openings in the plate in such a manner that the surfaces of the plate and said member are flush with respect to each other and a small concentric gap is maintained between the plate and member, means at the opposite surface of the plate for hermetically sealing said openings at the opposite surface, two of said spring systems each comprising a pair of elliptical spring arms, each measuring unit having four pairs of active strain gages for said spring arms respectively, the strain gages of each pair being disposed on the inner and outer surfaces of the spring arm individual thereto whereby half of the strain gages are exposed to tension and the other half to compression, said strain gages being arranged in Wheatstone bridge circuits and connected electrically with means externally of the plate for producing a visual indication of the magnitude of said friction forces but no indication of forces perpendicular to said plate or perpendicular to said flow respectively.

6. An internal balance system as in claim 5 further characterized in that said hermetically sealing means includes means for facilitating removal of individual measuring units from a test plate and replacement thereof with units having different spring rates whereby forces within different ranges may be measured by the balance system, or selectively the same units may be transferred to other plates having different surface conditions for comparative measurements.

7. An internal balance for measuring an external force applied axially to an aerodynamic body comprising, in combination, a sting, an elliptical flat spring having a pair of semi-elliptical springs arranged symmetrically in opposed relation about the axis of the body and joined together integrally at the ends thereof and at one pair of joined ends to said sting to form a unitary structure, a hollow cylindrical case having said springs disposed internally thereof and having said body supported externally thereof, means for securing the other pair of joined ends to one end of said case, means for securing the case within the body, said last named means having an opening for extension of said sting therethrough, a pair of active strain gages for each of said springs disposed on opposite side surfaces thereof, and means arranged externally of the body and connected electrically to said strain gages for producing a visual indication of the magnitude of said force.

8. A six component internal balance for measuring simultaneously lift, drag, and yaw forces and pitching, yawing, and rolling moments applied externally of an aerodynamic body comprising, in combination, a rod having tapered bores in the ends thereof respectively, a pair of closed rectangularly shaped flat springs having tapered rods secured thereto respectively and projected therefrom with the axis of each tapered rod disposed transversely of the spring individual thereto, said tapered rods being respectively fitted within said tapered bores, a pair of elliptical springs disposed symmetrically about the axis of said rod and arranged in spaced parallel relation along the length thereof, two pairs of flat straight springs secured respectively to the end portions of said rod, each pair of said straight springs being disposed along the long axis of one of said elliptical springs with the straight springs of each pair extended in diametrically opposed relation from said rod and secured to the elliptical spring individual thereto, a pair of ring members disposed respectively about said elliptical springs and concentrically with respect to said rod, a pair of webs for each of said rings for connecting the elliptical spring to the ring individual thereto, said webs extending perpendicularly to said straight springs, a pair of annular knife edge members secured to said rings respectively, said body being supported on said knife edge members, a cylindrical shell formed integrally with said ring members, means for securing one end of said shell to said body at the axis thereof, said body having a longitudinal axis coinciding with the axis of said rod, a plurality of elongated bars extended respectively through the openings defined by said ring members, webs and elliptical springs, means for securing one of said rectangular springs to one end of said plurality of bars, a hollow sting, means for securing the other end of said plurality of bars to said sting and for supporting the other of said rectangular springs thereon, a pair of strain gages carried by each of said rectangular springs and disposed on opposite sides of a flat spring portion thereof for yielding a quantity indicative of the axial force on the body, two pairs of strain gages for each pair of said straight springs with the strain gages of each pair being disposed on opposite surfaces of the straight spring individual thereto, said two pairs of strain gages being connected in a bridge circuit for yielding a quantity indicative of the magnitude and direction of the rolling moment, four pairs of strain gages for each of said elliptical springs and disposed respectively thereon adjacent said straight springs with the gages of each pair disposed on opposite side surfaces of the spring, the two pairs of strain gages for the half portions of each elliptical spring connected respectively to said webs being arranged in bridge circuits in a manner to yield measurable quantities respectively indicative of magnitude and direction of the yaw and pitch forces applied to the knife edge member individual thereto, the two yaw force quantities providing a measure of the yawing moment, the two pitch force quantities providing a measure of the pitching moment, means disposed externally of the body and responsive to said quantities for visually indicating the magnitude and direction of said forces, and conductor means extended through said sting for connecting said strain gages to said visual indicating means.

9. In a six component internal balance for measuring simultaneously lift, drag, and yaw forces and pitching, yawing, and rolling moments applied externally of an aerodynamic body, the combination of a rod having tapered bores in the ends thereof respectively, a pair of closed rectangularly shaped flat springs having tapered rods secured thereto respectively and projected therefrom with the axis of each tapered rod disposed transversely of the spring individual thereto, said tapered rods being respectively fitted within said tapered bores, a pair of elliptical springs disposed symmetrically about the axis of said rod and arranged in spaced parallel relation along the length thereof, two pairs of flat straight springs secured respectively to the end portions of said rod, each pair of said straight springs being disposed along the long axis of one of said elliptical springs with the straight springs of each pair extended in diametrically opposed relation from said rod and secured to the elliptical spring individual thereto, a pair of ring members disposed respectively about said elliptical springs and concentrically with respect to said rod, a pair of webs for each of said rings for connecting the elliptical spring to the ring individual thereto, said webs extending perpendicularly to said straight springs, a pair of annular knife edge members secured to said rings respectively, said body being supported on said knife edge members, a cylindrical shell formed integrally with said ring members, means for securing one end of said shell to said body at the axis thereof, said body having a longitudinal axis coinciding with the axis of said rod, a plurality of elongated bars extended respectively through the openings defined by said ring members, webs and elliptical springs, means for securing one of said rectangular springs to one end of said plurality of bars, a sting, means for securing the other end of said plurality of bars to said sting and for supporting the other of said rectangular springs thereon.

10. A six component internal balance as in claim 8 further characterized in that said strain gages are so arranged with respect to the springs of the balance and so arranged in the bridge circuits individual thereto as to cause the circuits to be unbalanced selectively in response to the forces to be measured thereby whereby each circuit yields a quantity indicative of the force measured thereby and balance of each circuit is maintained in response to the forces measured by the other circuits thereby to prevent interaction between the forces.

11. An internal balance for independently and simultaneously measuring forces externally applied to a hollow aerodynamic body coincident with a single pressure impact, said balance embodying force measuring spring units comprising cooperating integral arcuate and straight portions, the individual components of said spring units having large moments of inertia about an axis perpendicular to the direction of the applied force on an individual component and a small moment of inertia about an axis parallel to the direction of the applied force on an individual component, each of said arcuate and straight spring portions having at least one electrical transducer in contact therewith for selectively producing electrical potential differences when said spring portions are subjected to forces applied externally to said body, a plurality of balanced indicator circuits, each circuit arranged to individually maintain such balance upon application of said electrical potential differences produced by forces measured by the individual circuits thereby to prevent interaction between the forces whereby the magnitude and direction of the externally applied forces may be separately determined.

References Cited in the file of this patent

UNITED STATES PATENTS

| | | |
|---|---|---|
| 2,078,616 | Smith et al. | Apr. 27, 1937 |
| 2,252,464 | Kearns et al. | Aug. 12, 1941 |
| 2,293,288 | Gadd | Aug. 18, 1942 |
| 2,338,732 | Nosker | Jan. 11, 1944 |
| 2,362,626 | Giffen | Nov. 14, 1944 |
| 2,485,977 | Mains | Oct. 25, 1949 |
| 2,515,069 | Zola | July 11, 1950 |
| 2,555,355 | MacGeorge | June 5, 1951 |